United States Patent [19]

Karcher et al.

[11] 3,997,196

[45] Dec. 14, 1976

[54] COUPLING ASSEMBLY

[75] Inventors: Thomas D. Karcher, Rocky River; Richard J. Silagy, Parma, both of Ohio

[73] Assignee: The Hansen Manufacturing Co., Cleveland, Ohio

[22] Filed: Jan. 20, 1975

[21] Appl. No.: 542,172

[52] U.S. Cl. .................................. 285/86; 285/319; 285/316

[51] Int. Cl.$^2$ ..................... F16J 15/00; F16L 55/00

[58] Field of Search ............ 285/39, 316, 315, 314, 285/319, 322, 323, 86, 162

[56] References Cited

UNITED STATES PATENTS

| | | | |
|---|---|---|---|
| 737,357 | 8/1903 | Crump et al. | 285/319 X |
| 2,948,388 | 8/1960 | Raulins et al. | 285/86 X |
| 3,136,366 | 6/1964 | Brown et al. | 285/319 X |

FOREIGN PATENTS OR APPLICATIONS

| | | | |
|---|---|---|---|
| 1,576,127 | 7/1969 | France | 285/322 |

*Primary Examiner*—Wayne L. Shedd

[57] ABSTRACT

An improved coupling assembly includes a plug and socket which are connectable to interconnect a pair of fluid conduits. When the coupling is disconnected, resiliently deflectable spring fingers on a plug body are disposed in a retracted position. When the coupling assembly is to be connected, the retracted spring fingers are inserted through an opening into a socket chamber. A slide is then moved axially toward the socket to resiliently deflect the spring fingers outwardly away from the plug body to an extended position in which outer end surfaces on the spring fingers are engageable with an annular stop surface in the socket chamber. When the coupling is to be disconnected, the sleeve or slide is moved axially away from the spring fingers and their natural resilience causes them to move inwardly toward the plug body so that the outer ends of the spring fingers can pass through the opening as the plug is withdrawn from the socket chamber.

11 Claims, 4 Drawing Figures

COUPLING ASSEMBLY

BACKGROUND OF THE INVENTION

The present invention relates to a new and improved coupling assembly for connecting a pair of conduits in fluid communication and more specifically to a coupling assembly which includes resiliently deflectable spring fingers which are utilized to retain the coupling assembly in a connected condition.

There are many known coupling assemblies which are utilized to connect conduits in fluid communication and which include resiliently deflectable spring elements. Some of these known coupling assemblies are disclosed in U.S. Pat. Nos. 3,826,523; 3,711,125; 3,245,703; 2,318,965; 2,146,252; and 737,357. At least some of these coupling assemblies include spring fingers which are mounted on a plug and are deflected inwardly as the plug is inserted into a socket. Once the plug has been inserted into the socket, the spring fingers are allowed to move outwardly under the influence of their natural resilience. Of course, the distance which the spring fingers move outwardly is limited by the resilience of the spring fingers since they are not positively forced outwardly.

SUMMARY OF THE PRESENT INVENTION

The present invention provides a new and improved coupling assembly having a plurality of spring fingers which are resiliently deflected outwardly away from a plug body by a slide to engage a stop surface on a socket upon insertion of the plug into the socket. When the plug and socket are to be interconnected, the natural resilience of the spring fingers holds them closely adjacent to the plug body so that the spring fingers can pass through an opening into a socket chamber. Once the spring fingers have been inserted through the opening, the spring fingers are resiliently deflected radially outwardly to engage a stop surface in the socket chamber. To deflect the spring fingers outwardly, a slide is moved axially along the plug body and cams the spring fingers away from the plug body. When the coupling is to be disconnected, the slide is withdrawn and the natural resilience of the spring fingers causes them to move inwardly toward the plug body so that the spring fingers can pass through the opening as the plug is withdrawn from the socket. By varying the size and configuration of the slide, a family of quick-connect couplings can be achieved to interconnect conduits of different sizes.

Accordingly, it is an object of this invention to provide a new and improved coupling assembly which can be easily connected and which utilizes a slide to resiliently deflect a plurality of spring fingers outwardly away from a plug body upon insertion of the plug body into a socket.

Another object of this invention is to provide a new and improved coupling assembly which is disconnected by withdrawing a slide and allowing a plurality of spring fingers to move inwardly under the influence of their own natural resilience.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
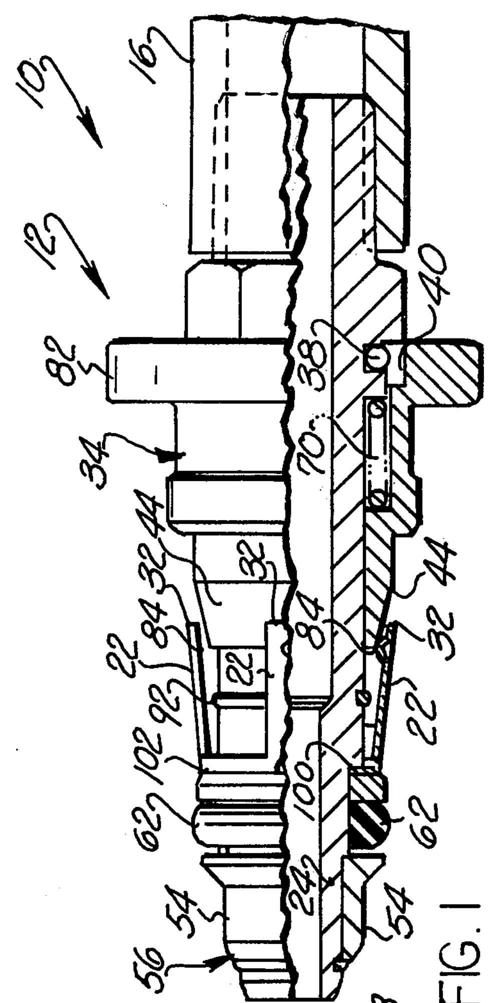
FIG. 1 is a partially broken away illustration of a coupling assembly constructed in accordance with the present invention, the coupling assembly being shown in a disconnected condition.
Figure 1:
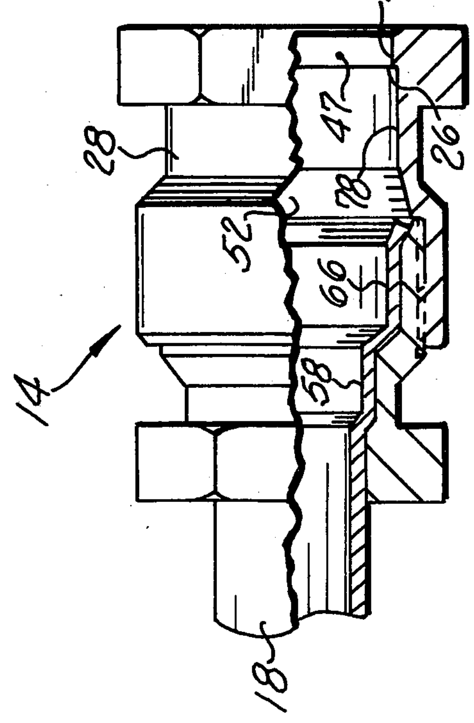

A coupling assembly 10 constructed in accordance with the present invention includes a plug 12 which is insertable into a socket 14 (FIG. 2) to connect a pair of conduits 16 and 18 in fluid communication. In accordance with a feature of the present invention, the coupling assembly 10 is held in the connected condition of FIG. 2 by engagement of a plurality of resilient spring fingers 22 on a plug body 24 with an annular stop surface 26 on a socket body 28. In order to maintain surfaces 32 on outer end portions of the spring fingers 22 in abutting engagement with the annular stop surface 26 when the coupling 10 is connected, a slide or sleeve member 34 resiliently deflects the spring fingers outwardly away from the retracted position of FIG. 1 to the extended position of FIG. 2. When the slide 34 is axially withdrawn from the forward position of FIG. 2, the natural resilience of the spring fingers 22 causes them to move inwardly toward the plug body 24 to enable the coupling 10 to be disconnected.

Figure 3:
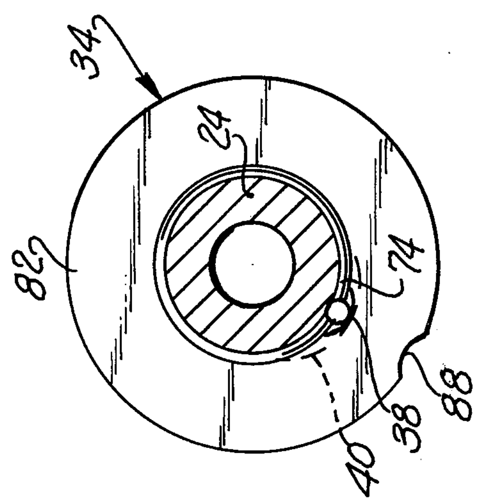
FIG. 3 is a sectional view, taken generally along the line 3—3 of FIG. 2, illustrating the construction of a latching arrangement for holding a slide in a withdrawn position.

When the coupling assembly 10 is in the disconnected condition of FIG. 1, the slide 34 is held in the withdrawn position by engagement of a locking ball 38 with an arcuate retaining groove 40 (FIG. 3) formed in the plug body 24. At this time a frustroconical cam surface 44 on the slide 34 is retracted so that a relatively small diameter outer end portion of the cam surface is disposed between the spring fingers 22 and the plug body 24. This enables the natural resilience of the spring fingers 22 to press them close to the plug body 24 when they are in the retracted position of FIG. 1. It should be noted that the outer end surfaces 32 of the spring fingers 22 are close enough to the plug body 24 so that the spring fingers can be inserted through a circular opening 47 defined by an inner surface 48 of the socket body 28.

When the coupling 10 is to be connected, the plug 12 is telescopically inserted into a socket chamber 52 formed within the socket body 28. As the plug 12 enters the socket chamber 52, a cylindrical outer surface 54 on a tapered leading end or nose portion 56 of the plug assembly 12 moves into sliding engagement with a cylindrical guide surface 58 in the socket chamber 52. In the illustrated embodiment of the invention, the guide surface 58 is formed by an outwardly swaged end portion of the conduit 18. Of course, the guide surface 58 could be formed on the socket body 28.

The interaction between the nose 56 of the plug assembly 12 and the guide surface 58 of the socket assembly 14 guides movement of the plug assembly into the socket chamber 52. As the plug assembly 12 moves into the socket chamber 52, the outer end surfaces 32 of the retracted spring fingers 22 pass through the circular opening 47 circumscribed by the annular stop surface 26. As this is occurring, an annular O-ring seal 62 on the plug body 24 moves into sealing engagement with a cylindrical surface 66 which is disposed axially outwardly of the guide surface 58. When the coupling is in the connected condition of FIG. 2, the cylindrical surface 54 on the nose portion 56 cooperates with the cylindrical guide surface 58 to prevent sidewise deflection of the plug body 24 and a resulting leakage of fluid around the O-ring seal 62.

Figure 2:
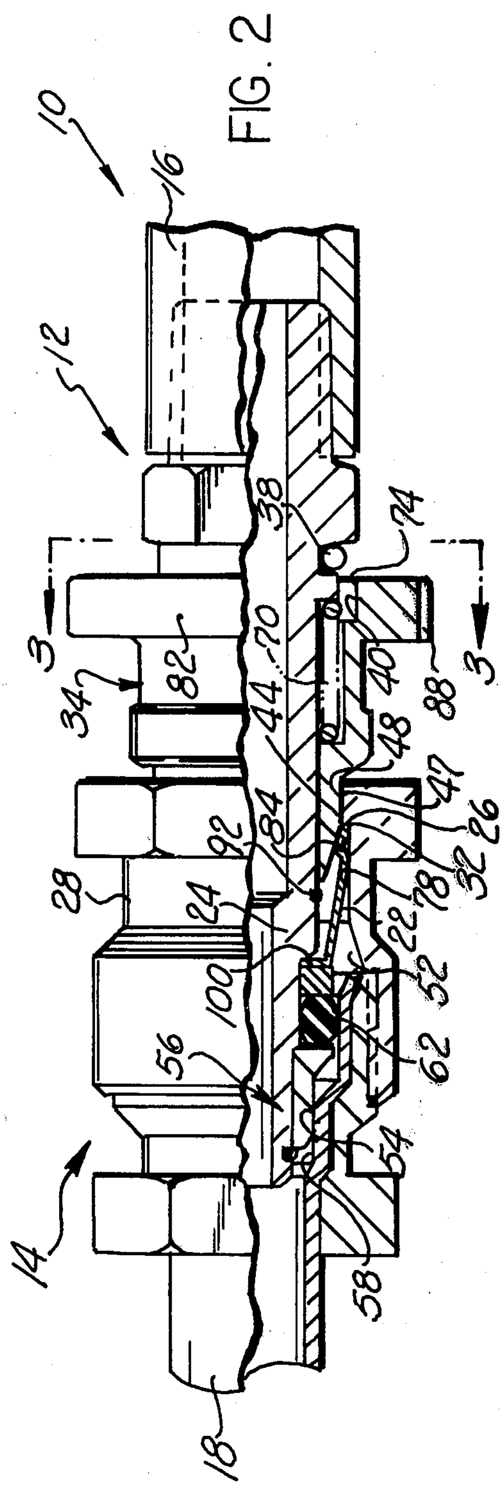
FIG. 2 is a partially broken away illustration of the coupling assembly of FIG. 1 in a connected condition.

Once the plug assembly 12 has been inserted into the socket chamber 52, the slide 34 is released for axial movement from the withdrawn position of FIG. 1 to the forward position of FIG. 2 under the influence of a coil type slide spring 70 which is disposed in a coaxial relationship with the plug body 24 and slide 34. To release the slide 34 for axial movement from the withdrawn position of FIG. 1, the slide is rotated about its central axis. This rotational movement of the slide moves the arcuate recess 40 relative to the locking ball 38 which is fixedly connected to the plug body 24. When the locking ball 38 is in axial alignment with an arcuate opening 74 (see FIG. 3), the slide 34 is moved axially outwardly along the clyindrical plug body 24 by the spring 70.

As the slide 34 moves axially outwardly, the frustroconical ramp surface 44 resiliently deflects the spring fingers 22 radially outwardly from the retracted position of FIG. 1 to the extended position of FIG. 2. When the spring fingers 22 are fully extended, the outer end portions of the spring fingers are pressed against a cylindrical inner surface 78 of the socket body 28 by the cam surface 44 on the slide 34. At this time, the end surfaces 32 on the spring fingers 22 are disposed immediately adjacent to the stop surface 26. The distance through which the spring fingers 22 are resiliently deflected outwardly from the body 24 by the slide 34 depends upon the diameter of the cylindrical inner surface 78 of the socket body 28. The frustroconical configuration of the cam surface 44 enables the spring fingers 22 to be pressed radially outwardly to varying extents to enable the plug 12 to be utilized with sockets 14 having inner surfaces 78 and stop surfaces 26 of different diameters. By varying the slope of the cam surface 44 and the configuration of the spring fingers 22, a family of quick-connect couplings can be achieved for a complete range of sizes of conduits 18 and socket bodies 28.

Once the spring fingers 22 have been resiliently deflected to the extended position of FIG. 2, disconnecting the coupling assembly 10 by pulling the plug and socket 12 and 14 axially apart is prevented by abutting engagement of the end surfaces 32 on the spring fingers 22 with the annular stop surface 26 on the socket body 28. The slide 34 is continuously pressed axially outwardly along the plug body 24 by the biasing spring 70 to continuously urge the spring fingers 22 outwardly when the coupling is in the connected condition of FIG. 2. Leakage of fluid between the outer surface of the plug body 24 and the inner surface of the socket body 28 is prevented by sealing engagement of the O-ring 62 with the surface 66.

When the coupling assembly 10 is to be disconnected, the slide 34 is withdrawn against the influence of the biasing springs 70 by manually pulling against a circular rim 82 on the slide. As the slide 34 is moved from the forward position of FIG. 2 toward the retracted position of FIG. 1, arcuate protuberances 84 on the outer end portions of the spring fingers 22 slide along the frustroconical ramp surface 44. As this is occurring, the natural resilience of the spring fingers 22 causes them to move radially inwardly toward the retracted position of FIG. 1. When the slide 34 is fully retracted against the influence of the spring 70, the end surfaces 32 on the spring fingers 22 will have moved radially inwardly of the stop surface 26 to enable the plug 12 to be withdrawn from the socket 14.

As the slide 34 is retracted, the locking ball 38 passes through the arcuate opening 74. The retracted slide 34 is then manually rotated about the central axis of the plug body 24 to again latch the slide 34 in the retracted position of FIG. 1. It should be noted that an arcuate index recess 88 (FIG. 3) is formed in the circular rim 82 radially outwardly from the opening 74 in the latching recess 40. The index recess 88 facilitates positioning the slide 34 with the opening 78 in axial alignment with the stationary latching ball 38 as the slide 34 is retracted. An annular stop ring 92 is provided on the plug body 24 to limit the axially outward movement of the slide 34 under the influence of the biasing spring 70 if the slide 34 should be inadvertently released when the coupling assembly 10 is in the disconnected condition of FIG. 1.

The spring fingers 22 are advantageously formed from a single piece of sheet metal which is stamped to form annular base 100 which extends radially outwardly from the plug body 24 and has an axially extending cylindrical lip 102. The resiliently deflectable spring fingers 22 extend outwardly from the lip 102. When the coupling assembly is in the disconnected condition of FIG. 1, the spring fingers 22 are slightly deflected so that the arcuate protuberances 84 press against the ramp surface 44 of the slide 34. Of course, when the coupling assembly 10 is in the connected condition of FIG. 2, the spring fingers are resiliently deflected outwardly to an even greater extent than when the coupling assembly is in the disconnected condition of FIG. 1. Although four equally spaced spring fingers 22 are utilized in the specific preferred embodiment of the invention illustrated in FIGS. 1 and 2, it should be understood that a different number of spring fingers and spacing around the lip 102 could be utilized if desired.

In the embodiment of the invention illustrated in FIGS. 1 and 2, the socket assembly 14 includes a socket body 28 which is separate from the conduit 18. In the embodiment of the invention illustrated in FIG. 4, the socket body 28 is eliminated to simplify construction of the socket assembly. Since many of the components of the embodiment of the invention illustrated in FIG. 4 are the same as components of the invention illustrated in FIGS. 1 and 2, similar numerals will be utilized to designate similar components, the suffix letter *a* being associated with the numerals of FIG. 4 to avoid confusion.

Figure 4:
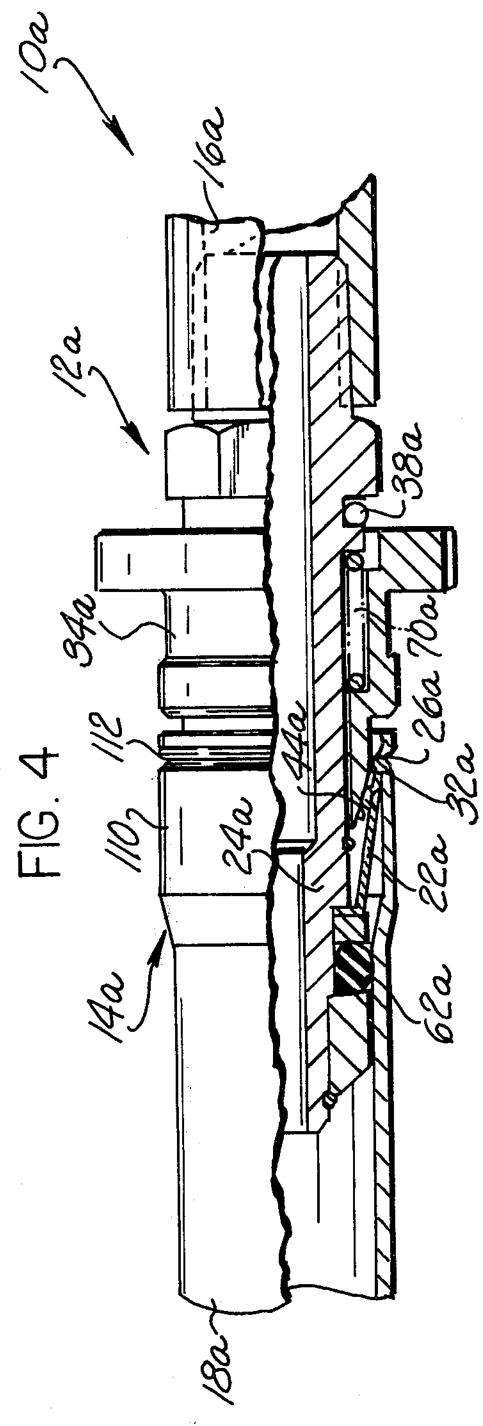
FIG. 4 is a partially broken away illustration of a coupling assembly forming a second embodiment of the invention.

When the coupling assembly 10a is in the connected condition of FIG. 4, a plug 12a is disposed within a unitary socket 14a. It should be noted that the unitary socket 14*a* includes a cylindrical body 110 which is a swaged extension of a metallic conduit 18*a*. An annular stop surface 26*a* is formed on the cylindrical body 110 by forming a circular recess 112 extending about the body. The annular stop surface 26*a* is engaged by end surfaces 32*a* formed on resiliently deflectable spring fingers 22*a* to hold the coupling assembly 10*a* in the connected condition of FIG. 4. The spring fingers 22*a* are deflected outwardly by a frustroconical ramp or cam surface 44*a* formed on a leading end portion of a slide 34*a*. A biasing spring 70*a* continuously urges the slide 34*a* axially outwardly to prevent the spring fingers 22*a* from moving inwardly toward the plug body 24*a*.

When the coupling 10*a* is to be disconnected, the slide 34*a* is pulled axially rearwardly along the plug body 24*a*. As this occurs, the spring fingers 22*a* move radially inwardly toward the plug body 24*a* under the influence of the natural resilience of the spring fingers 22*a*. Once the slide 34*a* has been retracted, the outer end portions of the spring fingers 22*a* will be disposed relatively close to the plug body 24*a* so that the plug body can pass through a circular opening formed inwardly of the stop surface 26*a*.

In view of the foregoing description it is apparent that the coupling assembly 10 includes a plurality of spring fingers 22 which are resiliently deflected outwardly away from a plug body 24 by a slide 34 to engage a stop surface 26 on a socket 14 upon insertion of the plug 12 into the socket. When the plug 12 and socket 14 are to be interconnected, the natural resilience of the spring fingers 22 holds them closely adjacent to the plug body so that the spring fingers 22 can pass through an opening 47 formed in a stop surface 26. Once the spring fingers 22 have been inserted through the opening 47, the spring fingers 22 are resiliently deflected radially outwardly to engage the stop surface 26 in the socket 14. To deflect the spring fingers 22 outwardly, the slide 34 is moved axially along the plug body 24 and cams the spring fingers 22 away from the plug body. When the coupling 10 is to be disconnected, the slide 34 is withdrawn and the natural resilience of the spring fingers 22 causes them to move inwardly toward the plug body 24 so that the spring fingers 22 can pass through the opening 47 formed in the stop surface 26 as the plug 12 is withdrawn from the socket 14. By varying the size and configuration of the slide 34, a family of quick-connect couplings 10 can be achieved to interconnect conduits of different sizes.

Having described specific preferred embodiments of the invention, the following is claimed:

1. A coupling assembly for connecting a pair of conduits in fluid communication, said coupling assembly comprising a socket, said socket including surface means for defining a socket chamber having a central opening and a stop surface within said socket chamber, a plug body adapted to be telescopically received in said socket chamber, a plurality of spring fingers resiliently deflectable outwardly from a retracted position adjacent to said plug body to an extended position spaced from said plug body, said spring fingers being movable through said central opening during movement of said plug body into said socket chamber with said spring fingers in said retracted position, said spring fingers having outer end portions engageable with said stop surface to retain said plug body in said socket chamber when said spring fingers are in the extended position, and slide means disposed on said plug body for deflecting said spring fingers outwardly from said retracted position to said extended position upon insertion of said plug body into said socket chamber, said slide means being movable axially along said plug body from a first position to a second position to deflect said spring fingers outwardly to said extended position, said slide means being movable axially from said second position to said first position to release said spring fingers for movement from said extended position to said retracted position under the influence of their own natural resilience, an axially outer end portion of said slide means being disposed in said socket chamber between said spring fingers and said plug body when said slide means is in said second position and said plug body is disposed in said socket chamber, said slide means having a manually engageable portion disposed outside of said socket chamber when said slide means is in said second position, said manually engageable portion of said slide means being movable axially along said plug body to effect movement of said slide means from said second position to said first position.

2. A coupling assembly as set forth in claim 1 further including spring means for urging said slide means toward said second position, said slide means being movable from said second position against the influence of said spring means.

3. A coupling assembly as set forth in claim 1 wherein said slide means includes axially tapering circular ramp means for engaging said outer end portions of said spring fingers, said ramp means including a portion of a first diameter and a portion of a second diameter which is greater than said first diameter, said portion of said ramp means having a first diameter being disposed between said outer end portions of said spring fingers and said plug body when said slide means is in said first position, said portion of said ramp means having a second diameter being disposed between said outer end portions of said spring fingers and said plug body when said slide means is in said second positions.

4. A coupling assembly as set forth in claim 1 further including spring means for urging said slide means toward said second position, said slide means being movable axially from said second position to said first position against the influence of said spring means, and latching means for retaining said slide means in said first position against the influence of said spring means.

5. A coupling assembly for connecting a pair of conduits in fluid communication, said coupling assembly comprising a socket, said socket including surface means for defining a socket chamber having a circular central opening and a stop surface within said socket chamber, a plug body adapted to be telescopically received in said socket chamber, a plurality of spring fingers mounted on said plug body and resiliently deflectable outwardly from a retracted position adjacent to said plug body to an extended position spaced from said plug body, said spring fingers being movable through said central opening during movement of said plug body into said socket chamber with said spring fingers in said retracted position, said spring fingers having leading end portions which are connected with said plug body and trailing end portions which are free to move toward and away from said plug body and which move through said central opening after said leading end portions upon movement of said plug body into said socket chamber, and slide means disposed on said plug body adjacent to said trailing end portions of said spring fingers, said slide means being movable along said plug body in a direction toward said leading end portions of said spring fingers to resiliently deflect said spring fingers outwardly from said retracted position in which said trailing end portions of said spring fingers are disposed in a generally circular array having a diameter which is less than the diameter of said central opening to an extended position in which said trailing end portions of said spring fingers are disposed in a generally circular array having a diameter which is greater than the diameter of said central opening and in which said trailing end portions of said spring fingers are engageable with said stop surface to retain said plug body in said socket chamber, said slide means being movable along said plug body in a direction away from said leading end portion of said spring fingers to enable said spring fingers to move from said extended position to said retracted position under the influence of their own natural resilience.

6. A coupling assembly as set forth in claim 5 wherein said slide means is movable axially along said plug body from a first position to a second position to deflect said spring fingers outwardly to said extended position, said slide means being movable axially from said second position to said first position to release said spring fingers for movement from said extended position to said retracted position under the influence of their own natural resilience.

7. A coupling assembly as set forth in claim 6 wherein an axially outer end portion of said slide means is disposed in said socket chamber between said spring fingers and said plug body when said slide means is in said second position and said plug is disposed in said socket chamber.

8. A coupling assembly as set forth in claim 6 further including spring means for urging said slide means toward said second position, said slide means being movable axially from said second position to said first position against the influence of said spring means, and latching means for retaining said slide means in said first position against the influence of said spring means.

9. A coupling assembly as set forth in claim 5 wherein said slide means includes a manually engageable portion disposed outside of said socket chamber when said plug body is telescopically received in said socket chamber, said manually engageable portion of said slide means being movable axially along said plug body to effect movement of said slide means.

10. A coupling assembly as set forth in claim 9 further including spring means for urging said slide means toward said leading end portions of said spring fingers, said slide means being movable away from said leading end portions of said spring fingers against the influence of said spring means to enable said spring fingers to move from said extended position to said retracted position.

11. A coupling assembly as set forth in claim 5 wherein said slide means includes axially tapering circular ramp means for engaging said trailing end portions of said spring fingers, said ramp means including a portion of a first diameter and a portion of a second diameter which is greater than said first diameter, said portion of said ramp means having a first diameter being disposed between said trailing end portions of said spring fingers and said plug body when said spring fingers are in said retracted position, said portion of said ramp means having a second diameter being disposed between said trailing end portions of said spring fingers and said plug body when said spring fingers are in said extended position.

* * * * *